United States Patent [19]

Koether et al.

[11] Patent Number: 5,043,860
[45] Date of Patent: Aug. 27, 1991

[54] COOKING APPLIANCE INTERFACE

[75] Inventors: Bernard G. Koether, Westport; Gerald F. Waugh, Orange, both of Conn.

[73] Assignee: Technology Licensing Corporation, Tequesta, Fla.

[21] Appl. No.: 351,021

[22] Filed: May 12, 1989

[51] Int. Cl.⁵ .............................................. G06F 15/20
[52] U.S. Cl. .................................. 364/138; 219/494; 364/400; 364/557
[58] Field of Search ............... 364/138, 139, 400, 477, 364/557, 200, 900; 219/492, 494, 501, 506, 10.55 E, 10.55 M; 99/325, 328; 371/16.4; 374/170, 171, 102, 149

[56] References Cited

U.S. PATENT DOCUMENTS

| | | | |
|---|---|---|---|
| Re. 31,864 | 4/1985 | Van Bavel et al. | 364/900 X |
| 4,197,581 | 4/1980 | Watrous et al. | 364/400 |
| 4,230,731 | 10/1980 | Tyler | 219/10.55 M X |
| 4,390,965 | 6/1983 | Albert | 364/400 |
| 4,463,436 | 7/1984 | Veneklase | 364/557 |
| 4,601,004 | 7/1986 | Holt et al. | 364/400 X |
| 4,636,949 | 1/1987 | Longabaugh | 364/400 |
| 4,672,540 | 6/1987 | Waugh et al. | 364/144 X |
| 4,718,776 | 1/1988 | Gillano et al. | 364/557 X |
| 4,812,963 | 3/1989 | Albrecht et al. | 364/400 X |

Primary Examiner—Joseph Ruggiero
Attorney, Agent, or Firm—Felfe & Lynch

[57] ABSTRACT

An interface suitable for use with a cooking computer communication system and preferably mounted on each of cooking appliances such as a baking oven, cooling unit or fryer. The interface monitors the physical characteristics of the cooking appliance through analog or digital sensors and provides information for diagnostics and quality control by a local store computer or a remote corporate mainframe computer. The interface includes a microcomputer responsive to a plurality of signals representing parameters of the cooking appliance for developing a multiplexed digital output signal representing the parameters for applying the output signal by a two-wire cable to a cooking computer communication system.

14 Claims, 4 Drawing Sheets

Fig. 4.

PARAMETER TABLE

| PARAMETER NUMBER | PARAMETER NAME | ADDRESS OF DATA ACTUAL | ADDRESS OF DATA PROGRAMMED |
|---|---|---|---|
| 1 | PORT A | 0000 | E000 |
| 2 | PORT B | 0001 | E001 |
| 3 | PORT C | 0002 | E002 |
| 4 | PORT D | 0003 | E003 |
| 5 | DDR A | 0004 | E004 |
| 6 | DDR B | 0005 | E005 |
| 7 | DDR C | 0006 | E006 |
| 8 | MANUFACTURER | FFFF | E007 |
| 9 | TYPE APPL. | FFFF | E008 |
| 10 | MODEL # | FFFF | E009 |
| 11 | SERIAL # | FFFF | E00A |
| 12 | DATE MFG. | FFFF | E00C |
| 13 | DATE INS. | FFFF | E00E |
| 14 | ANALOG 1 | 0100 | E010 |
| 15 | ANALOG 2 | 0102 | E014 |
| 16 | ANALOG 3 | 0104 | E015 |
| 17 | ANALOG 4 | 0106 | E016 |
| 18 | ANALOG 5 | 0108 | E020 |
| 19 | ANALOG 6 | 010C | E024 |
| 20 | ANALOG 7 | 010E | E025 |
| 21 | ANALOG RTD | 0110 | E026 |
| 22 | ANALOG THR | FFFF | E030 |
| 23 | ANALOG THR | FFFF | E031 |
| 24 | ANALOG VOLTS | FFFF | E032 |
| 25 | SET POINT | 0112 | E033 |
| 26 | STATUS | 0114 | E034 |

COOKING APPLIANCE INTERFACE

This invention relates to a cooking appliance interface for a cooking computer communication system.

The interface preferably includes a microcomputer which occupies a very small space and is mounted on a cooking appliance. For the purposes of this specification and claims, the term "cooking appliance" shall be understood to include a temperature-control unit which may, for example, be a cooling unit.

The interface of the present invention is particularly suitable for use with the cooking computer communication system of U.S. Pat. No. 4,812,963. The interface of the present invention preferably is an interface associated with and mounted on each of the cooking appliances such as the baking oven, cooling unit, and fryer of U.S. Pat. No. 4,812,963 and may operate through the cooking appliance computers individually associated with the cooking appliances or may operate directly from the communication bus to the cooking appliance, without passing its signals through the cooking appliance computers associated with the cooking appliances of U.S. Pat. No. 4,812,963.

The interface of the present invention monitors the physical characteristics of a cooking appliance through analog or digital sensors. For example, the sensors may measure some of the following: incoming gas pressure, gas pressure after a regulator, electrical voltage at the appliance, condition of the electrical phase, flue stack temperature, $CO_2$ content of flue stack gas, liquid levels in the cooking appliance, position of valves, positions of linear and rotary actuators, temperature of a cooking vessel, temperature of exhaust gases, exhaust temperature of various fluids, i.e., steam condensate, or water, or liquid oil.

These various physical characteristics provide a statistical history of the cooking appliance so that the interface can develop signals which can be applied to, for example, the bus of U.S. Pat. No. 4,812,963 to indicate performance data on the appliance such as whether the appliance is working within its normal operating tolerances, whether the appliance is ready for preventative maintenance service, and whether the appliance is ready for emergency service, or whether the appliance is being used to its capacity from which it can be determined what the addition of new menu items into the restaurant system would reflect in terms of the manufacturing capability of the restaurant.

The interface can also carry information to the bus such as the manufacturing lot number of the cooking appliance, the bill of materials, and other manufacturing code information which may be necessary for regulatory agency approval, warranty or service information, or product liability tracking of components and subassemblies.

The use of a cooking appliance computer is optional. The interface can be installed on appliances manufactured by different companies so that when they are on-site in a restaurant they will all communicate on the same data network which will yield the operator the following advantages: 1) he will be able to ascertain a physical asset inventory of his restaurants without going to the restaurant, he will be able to ascertain the accounting depreciation status of the equipment without going to the restaurant, he will be able to determine if his equipment is operating to its nominal standard performance, he will be able to optimize the energy utilization within his restaurant, he will be able to optimize the manufacturing capability and menu mix within his existing appliances and he will know ahead of time if he wishes to add a new menu item exactly what type of appliances it would be necessary to add and into which restaurant.

A significant feature of the interface is the provision of preventative maintenance. At the present time, the restaurant owner has no way of estimating what his maintenance will be other than by tracking what his maintenance cost has been in a prior period. When he makes up his budget, he doesn't know whether the equipment is operating at a 100% level or at a 70% level. The interface will enable him to optimize the operation of his restaurant while controlling his cost and giving him sufficient information so that he can plan ahead preventative maintenance so that field service personnel are not working the majority of their time in an emergency response mode. They will be working most of their time in a planned work mode so that their work is efficient and orderly.

The information from the cooking appliance interface may pass along the bus of the "Smart Commercial Kitchen" network of U.S. Pat. No. 4,812,963 via modems to a central computer system. Information there is sorted and when service is required, the proper inventory of parts and proper operating instructions are all dispatched to the store at the correct time in an orderly fashion.

Although this device has application in all commercial kitchens and bakeries, it could, of course, be utilized in residential appliances as well.

It is an object of the present invention to provide a new and improved interface associated with a cooking appliance for a cooking computer communication system.

It is another object of the invention to provide a new and improved interface associated with a cooking appliance for a cooking computer communication system, which interface provides a statistical history of the appliance in its use.

It is another object of the invention to provide a new and improved interface associated with a cooking appliance for a cooking computer communication system which provides cooking appliance identification.

It is another object of the invention to provide a new and improved interface associated with a cooking appliance for a cooking computer communication system which will provide a remote operator with inventory, accounting depreciation, equipment performance, energy utilization, maintenance and manufacturing capability information of his restaurant.

In accordance with the invention, in a cooking computer communication system for a cooking appliance, an interface associated with the cooking appliance comprises means for supplying a plurality of signals representative of a plurality of parameters of the cooking appliance. The interface also comprises microcomputer means responsive to the plurality of signals for developing a multiplexed digital output signal representing the parameters for applying the output signal by a two-wire cable to a cooking computer communication system.

Also in accordance with the invention, a cooking computer communication system comprises computer means for setting a desired value of at least one parameter of a cooking appliance and for sending messages The system also includes a bi-directional bus coupled to the computer means. The system also includes an interface associated with the cooking appliance comprising means for supplying a plurality of signals representative of a plurality of parameters of the cooking appliance. The interface also includes microcomputer means responsive to the plurality of signals for developing a multiplexed digital output signal representing the parameters for applying the output signal to the bi-directional bus.

Also in accordance with the invention, in a cooking computer communication system for a cooking appliance, an interface associated with the cooking appliance comprises microcomputer means for receiving a digital input signal representing a plurality of commands from a two-wire cable coupled to a cooking computer communication system for determining parameters of the cooking appliance. The interface also includes a plurality of means for supplying a plurality of signals representing the actual values of a plurality of parameters of the cooking appliance. The microcomputer means is responsive to the commands for programming values for the parameters of the cooking appliance and for controlling the appliance to conform the actual values to the programmed values.

Also in accordance with the invention, a method of managing the operation of a cooking appliance comprises supplying a cooking appliance with an interface comprising a microcomputer and mounted on the cooking appliance. The method also includes deriving information from the microcomputer as to at least one of cooking appliance inventory and depreciation, operating data and maintenance data.

Also in accordance with the invention, a method of managing the operation of a plurality of cooking appliances comprises supplying a plurality of cooking appliances individually with a plurality of interfaces individually comprising microcomputers. The method also includes deriving information from the microcomputers as to any of the following criteria:

a) whether the appliance is working within its normal tolerances, b) whether the appliance is ready for preventative maintenance, c) whether the appliance is ready for emergency service, d) whether the appliance is being used to its capacity, and e) manufacturing data.

The method also includes transmitting the derived information to a computer remote from the appliances.

For a better understanding of the invention, together with other and further objects thereof, reference is made to the following description, taken in connection with the accompanying drawings, and its scope will be pointed out in the appended claims.

Referring now to the drawings:

FIG. 4 is a parameter table utilized by the FIG. 1 microcomputer.

Figure 1:
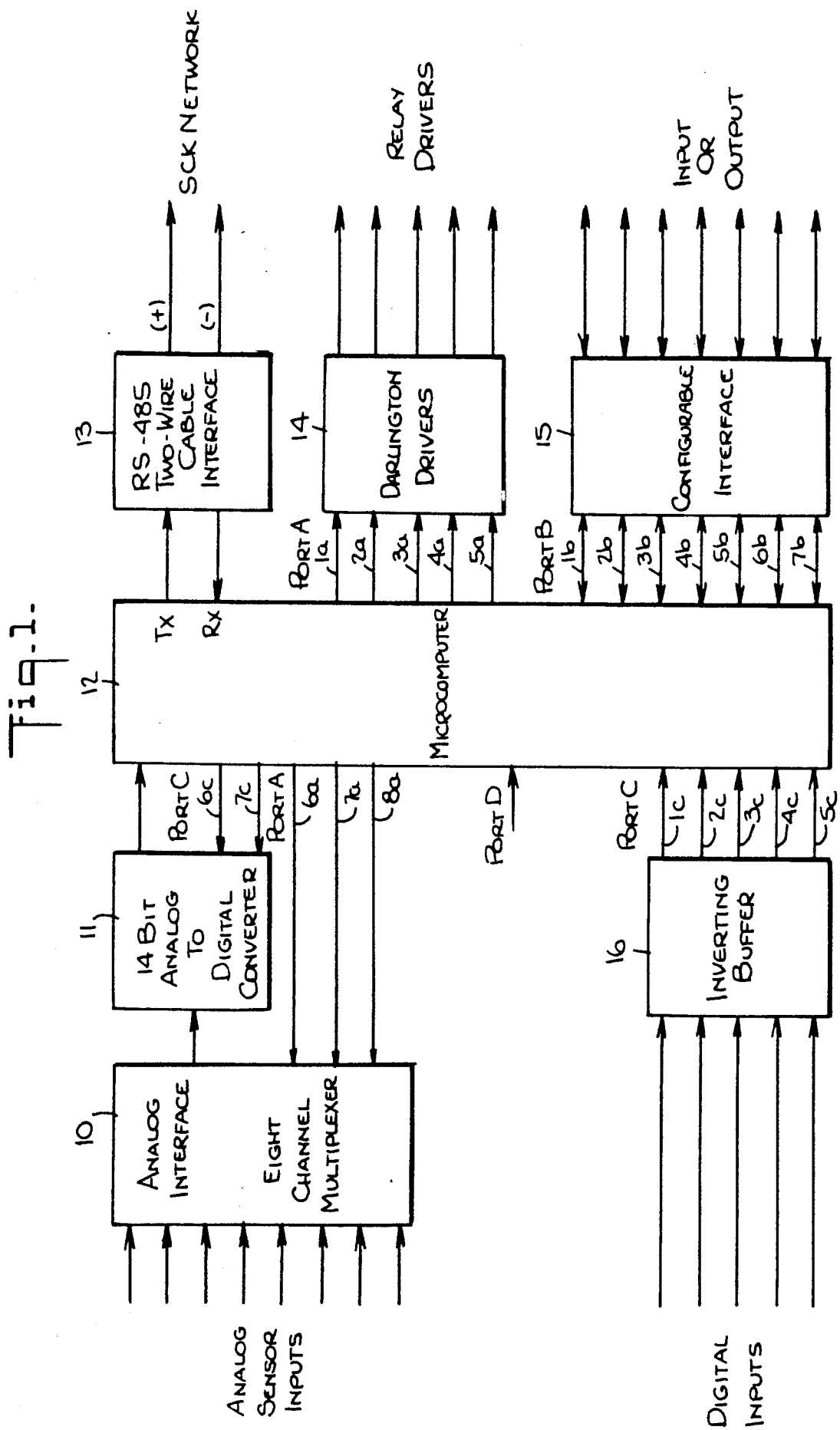
FIG. 1 is a schematic diagram of an interface associated with a cooking appliance and utilized in a cooking computer communication system.

Referring now more particularly to FIG. 1 of the drawings, in a cooking computer communication system for a cooking appliance, an interface associated with the cooking appliance comprises means for supplying a plurality of signals representative of a plurality of parameters of the cooking appliance. This means preferably comprises analog sensor input terminals of an analog interface 10 which also includes, for example, an 8-channel multiplexer. The analog sensor inputs may, for example, be any of the following parameters: incoming gas pressure, gas pressure after the regulator, electrical voltage at the appliance, condition of the electrical phase, flue stack temperature, $CO_2$ content of stack gas, liquid levels in the appliance, positions of valves, positions of linear and rotary actuators, temperature of cooking vessel, temperature of exhaust gases, and exhaust temperature of various fluids, i.e., steam condensate or water or liquid oil.

The analog interface output is coupled to a, for example, 14-bit analog-to-digital converter 11 of conventional construction.

The interface associated with the cooking appliance also includes microcomputer means responsive to the plurality of signals for developing a multiplexed digital output signal representing the parameters for applying the output signal by a two-wire cable to a cooking computer communication system. The microcomputer means comprises a microcomputer 12 coupled to the output of the analog-to-digital converter 11.

For the purposes of clarity, the apparatus of FIG. 1 represents the analog-to-digital converter and the microcomputer separately. However, the microcomputer may, for example, include an analog-to-digital converter and a microprocessor which includes such hardware as a central processing unit, program and random access memories, timing and control circuitry, input-output interface devices and other conventional digital subsystems necessary to the operation of the central processing unit as is well understood by those skilled in the art. The microprocessor operates according to the computer program produced according to the flow chart represented in the drawings.

The microcomputer 12 has a transmit output circuit TX and a receive input circuit RX coupled to a two-wire cable interface, for example, an RS-485 cable interface which has an output for coupling through a two-wire cable to a cooking computer communication system, for example, the Smart Commercial Kitchen network bus of U.S. Pat. No. 4,812,963.

The microcomputer 12 has an output port A having terminals 1a to 5a, inclusive coupled to Darlington drivers 14 which can, for example, provide up to 350 milliamperes of current on their output lines which can control solenoids and actuators and, for example, in a fryer can operate basket lifts and supply heat demand. Port A also has three other output terminals 6a, 7a, 8a coupled to the multiplexer of analog interface 10 for supplying control signals thereto.

The microcomputer 12 also has a port B having terminals 1b to 7b, inclusive, which are coupled to a configurable interface 15 which have all input or output terminals which can drive circuits with up to 350 milliampere currents. The terminals of port B can be output or input terminals accordingly.

The microcomputer 12 also has a Port C having terminals 1c to 5c, inclusive, coupled to the output of an inverting buffer 16 whose input terminals have digital inputs applied thereto by digital signal generators of the cooking appliance representing, for example, manufacturing data.

Port C of the microcomputer 12 also has output terminals 6c and 7c which supply control signals to the analog-to-digital converter 11. The microcomputer 12 also has an input only port D.

Figure 2:
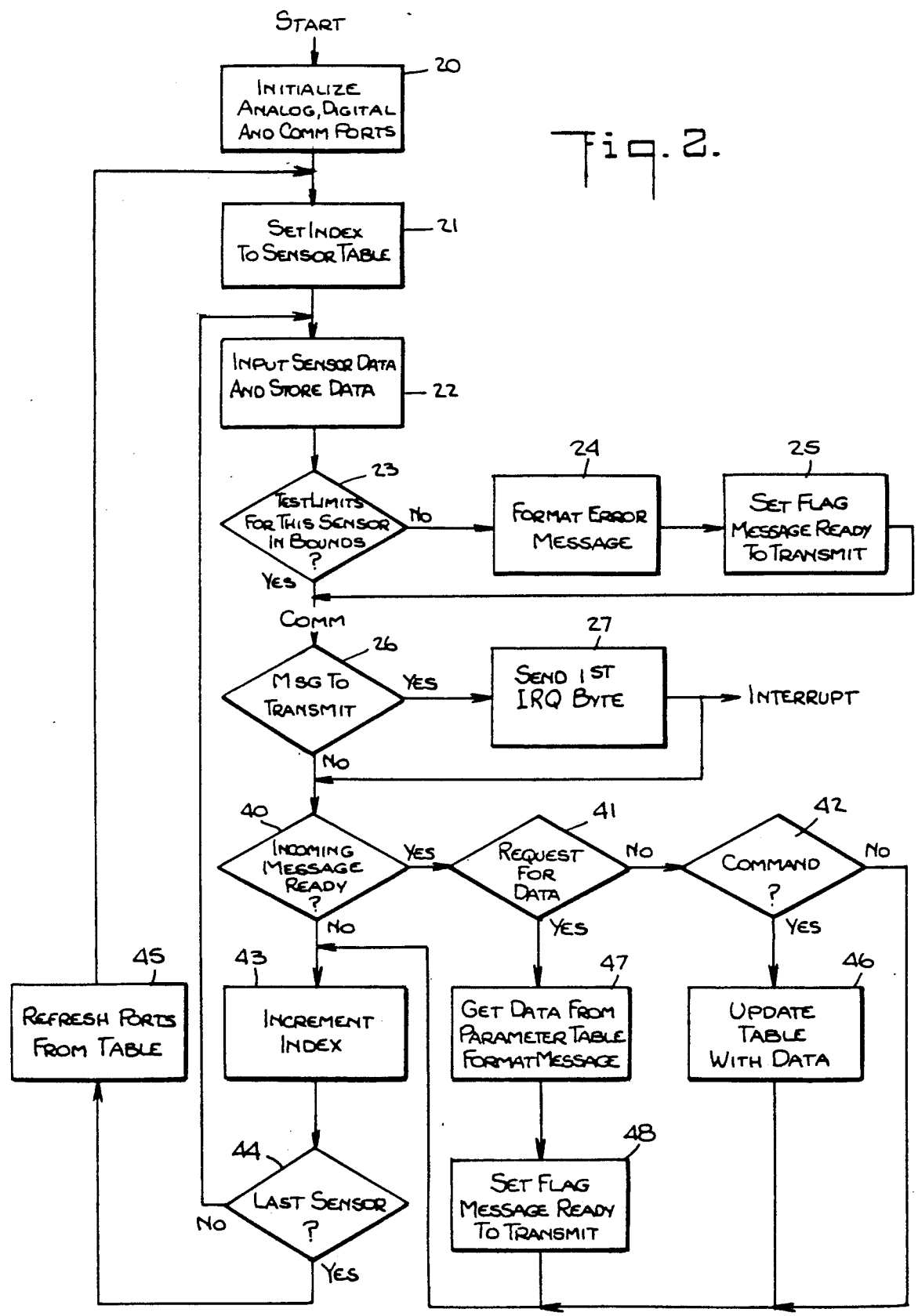
FIGS. 2 and 3 are flow charts representing the operation of the FIG. 1 interface.
Figure 3:
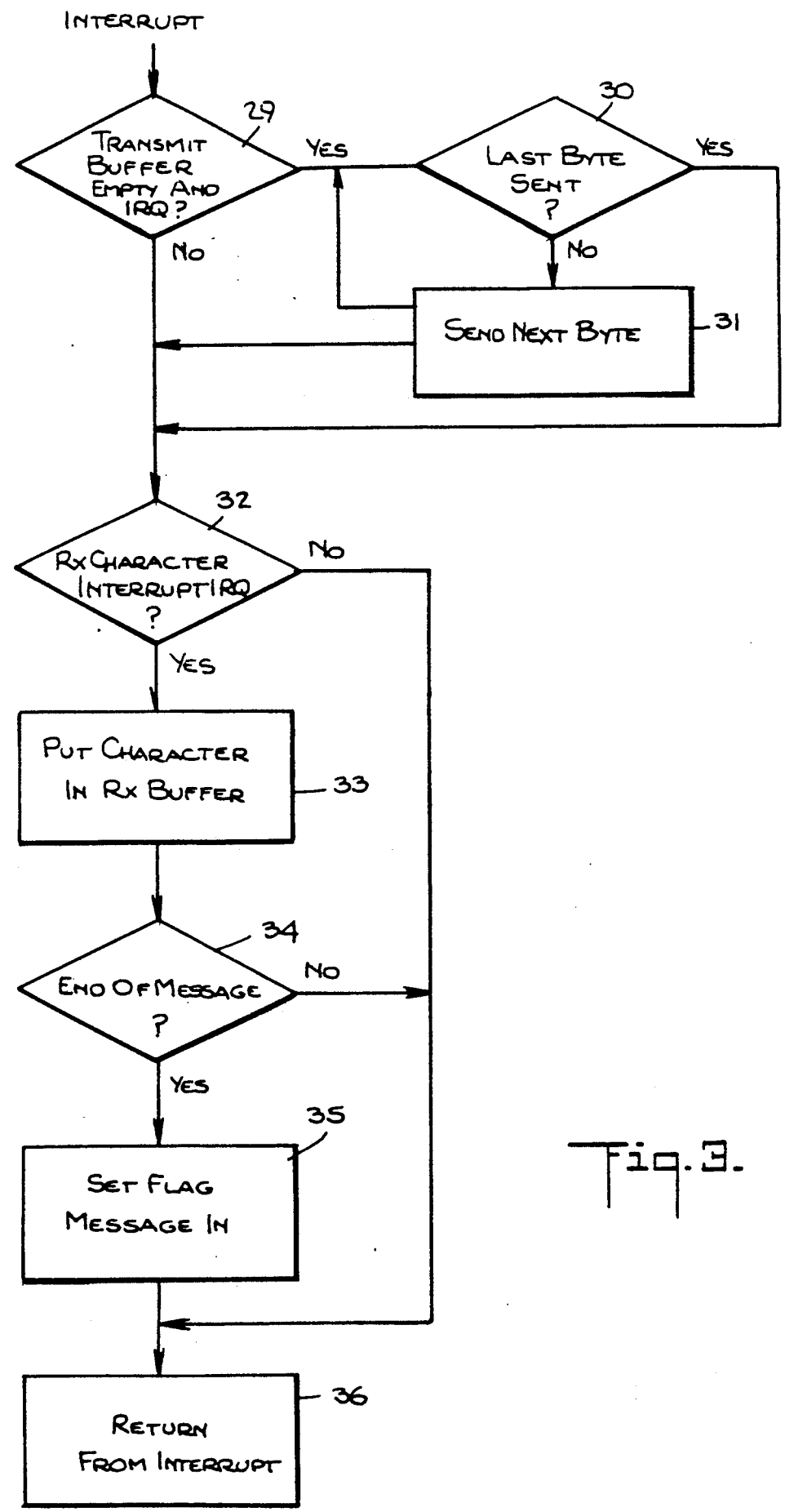

Referring now more particularly to FIGS. 2 and 3 of the drawings, there is represented a flow chart of the operation of the FIG. 1 interface in a cooking computer communication system such as, for example, the Smart Commercial Kitchen network of U.S. Pat. No. 4,812,963 which includes a local store computer for setting a desired value of at least one parameter of the cooking appliance and for sending messages and which also includes a remote corporate mainframe computer for setting a desired value of at least one parameter of a cooking appliance and for sending messages. The communication system also includes a bi-directional bus coupled to the local store computer. The interface of the present invention associated with, and preferably mounted on, the cooking appliance may apply its output signals directly to the communications bus without passing through the cooking appliance computers of U.S. Pat. No. 4,812,963 to communicate with the local store computer or the remote corporate mainframe computer.

Referring again to FIG. 2 of the drawings, the start key is effective to "initialize analog, digital and comm ports" 20. "Comm" indicates communication. The "initialize analog, digital and comm ports" microprocessor portion 20 is coupled to a "set index to sensor table" microprocessor portion 21. The sensor table may, for example, be a parameter table discussed more fully in connection with FIG. 4 hereinafter. The microprocessor portion 21 is coupled to an "input sensor data and store data" microprocessor portion 22. The microprocessor portion 22 is coupled to a "test limits for this sensor in bounds?" microprocessor portion 23. The "no" output of the microprocessor portion 23 is coupled to a "format error message" microprocessor portion 24 which is in turn coupled to a "set flag - message ready to transmit" microprocessor portion 25.

The microprocessor portion 25 is coupled through communications to a "message to transmit?" microprocessor portion 26. The "yes" output of the microprocessor portion 26 is coupled to a "send first IRQ byte" microprocessor portion 27. The first IRQ byte is the first interrupt request byte which is applied to the interrupt portion of the microprocessor represented in FIG. 3.

Referring to FIG. 3, "transmit buffer empty and IRQ?" microprocessor portion 29 is coupled to the microprocessor portion 27 to determine upon an interrupt request whether the message to transmit has been completely transmitted. The "yes" output of the microprocessor portion 29 is coupled to a "last byte sent?" microprocessor portion 30. The "no" output of the microprocessor portion 30 is coupled to a "send next byte" microprocessor portion 3 having its output also coupled to the microprocessor portion 30.

The "yes" output of the microprocessor portion 30 is coupled to a "RX character interrupt IRQ?" microprocessor portion 32. The "yes" output of the microprocessor portion 32 is coupled to a "put character in RX buffer" microprocessor portion 33. The microprocessor portion 33 is coupled to an "end of message?" microprocessor portion 34. The "yes" output of the microprocessor portion 34 is coupled to a "set flag - message in" microprocessor portion 35. The microprocessor portion 35 is coupled to a "return from interrupt" microprocessor portion 36. The "no" outputs of the microprocessor portions 32 and 34 are also coupled to the "return from interrupt" microprocessor portion 36 of FIG. 3.

Returning to the flow chart of FIG. 2, the "no" output of the "message to transmit?" microprocessor portion 26 is coupled to the "incoming message ready?" microprocessor portion 40. The output of the microprocessor portion 27 is also coupled to the "incoming message ready?" microprocessor portion 40 as well as the "return from interrupt" microprocessor portion 36 of FIG. 3.

The "yes" output of the microprocessor portion 40 is coupled to a "request for data?" microprocessor portion 41. The "no" output of the "request for data?" microprocessor portion 41 is coupled to a "command?" microprocessor portion 42. The "no" output of the microprocessor portion 42 is coupled to the "no" output of the "incoming message ready?" microprocessor portion 40 which together are coupled to the "increment index" microprocessor portion 43 which increments the index of the sensor table to be described subsequently.

The microprocessor portion 43 is coupled to a "last sensor?" microprocessor portion 44. The "yes" output of the microprocessor portion 44 is coupled to a "refresh ports from table" microprocessor portion 45 which causes the ports indicated on the sensor table to be updated with sensor information. The microprocessor portion 45 is coupled to the input of the microprocessor portion 21.

The "yes" output of the "command?" microprocessor portion 42 is coupled to an "update table with data" microprocessor portion 46. The microprocessor portion 46 is coupled to the "increment index" microprocessor portion 43.

The "yes" output of the "request for data?" microprocessor portion 41 is coupled to a "get data from parameter table - format message" microprocessor portion 47 which is coupled to a "set flag - message ready to transmit" microprocessor portion 48. The microprocessor portion 48 is coupled to the "increment index" microprocessor portion 43.

Referring now more particularly to FIG. 4 of the drawings, there is represented a parameter table which may also be called a sensor table which diagrams the addresses of data of various parameters of the cooking appliance. These addresses are in registers of the microcomputer 12 and are addresses of actual data measured by sensors or programmed data which is electrically erasable and can be changed upon command from the local store computer or remote corporate mainframe computer. Parameters 1, 2, 3 and 4 are, for example, one terminal each of ports A, B, C and D which have both actual values and programmed values at the addresses indicated. Parameters 5, 6, 7 are data direction registers for ports A, B and C and can be programmed to be input or output registers having, for example, actual and programmed values at the addresses indicated. Parameters 8-13, inclusive, relate to the manufacturer identification, type cooking appliance, model number, serial number, date of manufacture, and date of installation and have only programmed values at the addresses indicated. Parameters 14-20 are analog parameters having actual sensed values at the addresses indicated and having programmed values at the addresses indicated, the programmed values being electrically erasable by a Smart Commercial Kitchen computer which can set a new programmed value and ask for the actual value of the parameter. Parameter 21 is a analog RTD (resistance temperature device) which may be platinum. Parameter 22 is an analog THR which is a thermistor. Analog 23 is also an analog THR. Parameter 24 is an analog voltage which has a programmed value at the address indicated. Parameter numbers 22, 23 and 24 are present so that the computer can identify what kind of sensor is on that channel and accordingly have no actual value address. Parameter 25 is the setpoint parameter which has an actual value and a programmed value at the addresses indicated. If the local store computer or the remote corporate mainframe computer is in control, the setpoint parameter number 25 doesn't have any effect except to act as a fall-back control in the event of a failure in communications. Parameter 26 is a status parameter to indicate whether the cooking appliance is under local store computer control or remote corporate mainframe computer control.

As an example of operation, parameter 14 representing analog 1 may have a programmed value at address E010 which represents a low limit for analog 1 and may have an address at E012 which represents a high limit for analog 1. The received signal from the local store computer may ask whether the actual value of analog 1 is between the low limit and the high limit or may electrically erase the low limit or the high limit to set other limits.

The programmed value for any of the parameters may be electrically erased by a signal received from the local store computer or Smart Commercial Kitchen network so that under command of the local store computer the parameter can be controlled to conform the actual value to the programmed value. This may be accomplished through the Darlington drivers and relay drivers of FIG. 1 and through the configurable interface of FIG. 1.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a cooking computer communication system for a cooking appliance, a cooking appliance control and monitoring system including an interface and comprising:
    means for supplying a plurality of signals representative of a plurality of parameters of the cooking appliance;
    a local area network comprising an interface having a parameter table having programmed values including appliance identification data and data indicating normal operating tolerances of the cooking appliance and having at least one actual value of measured data of the cooking appliance and said network comprising a two-wire cable of a cooking computer serial communication system; and
    microcomputer means responsive to said plurality of signals and responsive to commands from said communication system for developing an output signal representing said parameters for applying said output signal by said local area network to said cooking computer serial communication system.

2. A system in accordance with claim 1 in which said means for supplying a plurality of signals representative of a plurality of parameters of the cooking appliance comprises means for supplying a plurality of analog signals.

3. In a cooking computer communication system for a plurality of cooking appliances, a plurality of interfaces individually included in the cooking appliances and comprising:
    means for supplying a plurality of signals representative of a plurality of parameters of each of the cooking appliances;
    a local area network comprising said interfaces having a parameter table having programmed values including appliance identification data and data indicating normal operating tolerances of the cooking appliances and having at least one actual value of measured data of the cooking appliances and said network comprising two-wire cables of computer controls; and
    a plurality of microcomputer means included in said interfaces and including said parameter tables responsive to said plurality of signals for individually developing multiplexed digital output signals representing said parameters of each cooking appliance for developing said output signals by said local area network of computer controls.

4. A system in accordance with claim 1 in which said means for supplying a plurality of signals representative of a plurality of parameters of the cooking appliance comprise means for supplying a plurality of signals representative of a plurality of parameters including temperature of the cooking appliance.

5. A system in accordance with claim 1 in which said interface is mounted on the cooking appliance.

6. A cooking computer communication system comprising:
    computer means for setting a desired value of at least one parameter of a cooking appliance and for sending messages;
    a local area network communications system including a bi-directional two-wire bus coupled to said computer means;
    a cooking appliance control and monitoring system including an interface having a parameter table having programmed values including appliance identification data and data indicating normal operating tolerances of the cooking appliance and having at least one actual value of measured data of the cooking appliance and said interface comprising means for supplying a plurality of signals representative of a plurality of parameters of said cooking appliance, and microcomputer means included in said interface and including said parameter table responsive to said plurality of signals for developing a multiplexed digital output signal representing said parameters for applying said output signal to said bi-directional bus.

7. A system in accordance with claim 6, in which said interface means for supplying a plurality of signals representative of a plurality of parameters of the cooking appliance comprises means for supplying a plurality of analog signals.

8. A cooking computer communication system comprising:
    computer means for setting a desired value of at least one parameter of a plurality of cooking appliances and for sending messages;
    a two-wire local area network coupled to said computer means;
    a cooking appliance control and monitoring system including interfaces each having a parameter table having programmed values including appliance identification data and data indicating normal operating tolerances of the cooking appliance and having at least one actual value of measured data of the cooking appliance and said interfaces comprising means for supplying a plurality of signals representative of a plurality of parameters of each of the cooking appliances, and microcomputer means included in said interfaces and including said parameter tables responsive to said plurality of signals of each of said plurality of cooking appliances for individually developing multiplexed digital output signals representing said parameters of each of the individual cooking appliances for individually applying said output signals by individual two-wire cables to said two-wire local area network.

9. The system in accordance with claim 6, in which said means for supplying a plurality of signals representative of a plurality of parameters of the cooking appliance comprises means for supplying a plurality of parameters including temperature of the cooking appliance.

10. The system in accordance with claim 6, in which said interface is mounted on the cooking appliance.

11. In a cooking computer communication system for a cooking appliance, a cooking appliance control and monitoring system including an interface and comprising:
  an interface having a parameter table having programmed values including appliance identification data and data indicating normal operating tolerances of the cooking appliance and having at least one actual value of measured data of the cooking appliance;
  microcomputer means included in said interface and including said parameter table for receiving a digital input signal representing a plurality of commands from a two-wire cable coupled to a cooking computer communication system for determining parameters of the cooking appliance; and
  a plurality of means for supplying a plurality of signals representing the actual values of a plurality of parameters of the cooking appliance;
  said microcomputer means being responsive to said commands for programming values for said parameters of said cooking appliance and for controlling the appliance to conform said actual values to said programmed values.

12. In a cooking computer communication system for a plurality of cooking appliances, a cooking appliance control and monitoring system including a plurality of interfaces comprising:
  a plurality of interfaces each having a parameter table having programmed values including appliance identification data and data indicating normal operating tolerances of the cooking appliances and having at least one actual value of measured data of the cooking appliances;
  a plurality of microcomputer means included in said interfaces and including said parameter tables for receiving digital input signals representing a plurality of commands from a plurality of two-wire cables coupled to a cooking computer communication system for determining a plurality of parameters of the plurality of cooking appliances; and
  a plurality of means for supplying a plurality of signals representing the actual values of a plurality of parameters of the plurality of cooking appliances;
  said plurality of said microcomputer means being responsive to said commands for programming values for said plurality of parameters of said plurality of cooking appliances and for controlling the plurality of appliances to conform said actual values to said programmed values.

13. An interface in accordance with claim 11, in which said plurality of means for supplying a plurality of signals representing the actual values of a plurality of parameters of the cooking appliance includes means for developing a signal representing the actual value of the temperature of the cooking appliance.

14. An interface in accordance with claim 11, in which said interface is mounted on the cooking appliance.

* * * * *

UNITED STATES PATENT AND TRADEMARK OFFICE
CERTIFICATE OF CORRECTION

PATENT NO. : 5,043,860

DATED : August 27, 1991

INVENTOR(S) : Bernard G. Koether et al

It is certified that error appears in the above-identified patent and that said Letters Patent is hereby corrected as shown below:

Column 2, line 66 for "messages The" read --messages.  The --.

Column 5, line 53 for "portion 3" read --portion 31 --.

Signed and Sealed this

Ninth Day of March, 1993

*Attest:*

STEPHEN G. KUNIN

*Attesting Officer*　　　*Acting Commissioner of Patents and Trademarks*